US 8,362,971 B1
Jan. 29, 2013

(12) United States Patent
Chatterjee et al.

(10) Patent No.: US 8,362,971 B1
(45) Date of Patent: Jan. 29, 2013

(54) INDEPENDENT VIEWS GENERATED FOR MULTIPLE DISPLAY DEVICES BY A SOFTWARE APPLICATION

(75) Inventors: Viraj Chatterjee, Delhi (IN); Susanta Sarkar, Nodia (IN); Naresh C. Gupta, Nodia (IN)

(73) Assignee: Adobe Systems Incorporated, San Jose, CA (US)

( * ) Notice: Subject to any disclaimer, the term of this patent is extended or adjusted under 35 U.S.C. 154(b) by 161 days.

(21) Appl. No.: 13/045,486

(22) Filed: Mar. 10, 2011

Related U.S. Application Data

(63) Continuation of application No. 10/680,930, filed on Oct. 7, 2003, now Pat. No. 7,911,409.

(51) Int. Cl.
  *G09G 5/00* (2006.01)
(52) U.S. Cl. .......................................... 345/3.1; 345/3.3
(58) Field of Classification Search .................. 345/3.1, 345/3.3
  See application file for complete search history.

(56) References Cited

U.S. PATENT DOCUMENTS

| 5,488,385 | A | * | 1/1996 | Singhal et al. ................. 345/3.1 |
| 5,640,522 | A | | 6/1997 | Warrin |
| 5,737,599 | A | | 4/1998 | Rowe et al. |
| 5,781,190 | A | | 7/1998 | Gorbet et al. |
| 5,859,623 | A | | 1/1999 | Meyn et al. |
| 5,917,480 | A | | 6/1999 | Tafoya et al. |
| 6,008,807 | A | | 12/1999 | Bretschneider et al. |
| 6,041,333 | A | | 3/2000 | Bretschneider et al. |
| 6,601,129 | B1 | | 7/2003 | Arakeri et al. |
| 6,956,542 | B2 | * | 10/2005 | Okuley et al. .................. 345/1.1 |
| 7,010,551 | B2 | * | 3/2006 | Terayama et al. ............. 707/200 |
| 7,102,591 | B2 | * | 9/2006 | Shih ............................... 345/1.1 |

OTHER PUBLICATIONS

Adobe, "Adobe Acrobat Player MediaExpress Cure Presentation Anixiety", Press Release, May 1996,1 pg.
Adobe, Acrobat Player, Product and Market Backgrounder, May 1995, 4 pgs.
Adobe, Acrobat Player Extensions, 2 pgs.
Adobe, Acrobat Player, Presentation Slides, Jan. 1996, 14 pgs.
Proxima, MediaExpress User's Guide, Introducing the MediaExpress, 32 pgs.
Proxima, MediaExpress, Model ME40F, ME40H, Installation Guide, May 1996, 6 pgs.
U.S. Patent Office, U.S. Appl. No. 10/680,930, filed Oct. 7, 2003, mailed Nov. 28, 2006, 12 pgs.

* cited by examiner

*Primary Examiner* — Kevin M Nguyen
(74) *Attorney, Agent, or Firm* — Fish & Richardson P.C.

(57) ABSTRACT

Systems and techniques to display an electronic document to multiple display devices simultaneously. In general, in one implementation, the technique includes: identifying, by a software application in a computing system, display characteristics of multiple display devices, and generating, by the software application in the computing system, simultaneous independent views of an electronic document on the display devices by separately rendering the electronic document to each of the display devices based on the identified display characteristics of the device. A system can include one or more peripheral display devices, and a data processing system including a primary display device and a software application that generates simultaneous independent views of an electronic document on the display devices based on display characteristics of the display device as identified by the software application.

20 Claims, 3 Drawing Sheets

INDEPENDENT VIEWS GENERATED FOR MULTIPLE DISPLAY DEVICES BY A SOFTWARE APPLICATION

CROSS-REFERENCE TO RELATED APPLICATIONS

This application is a continuation application of and claims the benefit of priority to U.S. application Ser. No. 10/680,930, filed on Oct. 7, 2003; the disclosure of the prior application is considered part of (and is incorporated by reference in) the disclosure of this application.

BACKGROUND OF THE INVENTION

The present application describes systems and techniques relating to displaying application data in computing systems, for example, displaying an electronic document to multiple display devices simultaneously.

Various software applications allow documents to be presented simultaneously to multiple display devices. Typically, a software application renders a document to a primary device, such as a display monitor of a host computer running the software application, and then uses mirroring functionality provided by interface hardware to mirror the display on the primary device to a secondary device, such as a projector. To make use of the larger resolution typically available on the secondary display device, the software application performs a pixel zoom. Alternatively, the application inserts a bitmap of the desired size as part of the document in the host computer, and then uses this bitmap to show a larger image on the secondary device.

Additionally, in the document presentation context, various hardware and software approaches have been used to present a slide show on multiple display devices with different display resolutions. Presenter-to-Go™ (PTG), provided by MARGI Systems, Inc. of Fremont, Calif., is software that enables presentations to be made from handheld devices to predefined display devices at predefined resolutions. This software includes two components: a first component that resides on a computer and assists in converting presentation documents in formats such as Microsoft PowerPoint to a PTG format based on the resolution of the output device to be used; and a second component that resides on the handheld device, reads this conversion-target format and does the presentation to the output device, such as a projector.

Hardware approaches to document presentation conventionally use a dedicated presentation hardware device. Such dedicated presentation devices typically have interfaces for accepting files, making manipulations regarding how the presentation should be shown, and outputting the presentation to predefined display devices.

SUMMARY OF THE INVENTION

In general, the invention features systems and techniques relating to displaying an electronic document to multiple display devices simultaneously. According to an aspect, a software application in a computing system can identify display characteristics of multiple display devices, and generate simultaneous independent views of an electronic document on the display devices by separately rendering the electronic document to each of the display devices based on the identified display characteristics of the device. Generating the independent views can involve separately rendering the electronic document according to presentation tags associated with content in the electronic document, the presentation tags indicating device-dependent rendering to be applied to the content based upon assigned device types of the display devices. Identifying the display characteristics can involve periodically re-identifying the display characteristics of the display devices, in conjunction with multiple iterations of the separate renderings of the electronic document to allow display devices to be added and removed dynamically. Moreover, the software application can manage the presentation tags associated with the content based on user input.

A first of the independent views can include rendered content from the document not included in a second of the independent views. The content can include annotations of the document. Identifying the display characteristics can involve periodically obtaining display characteristics of the display devices, and obtaining the display characteristics can involve obtaining screen resolution and color depth information of the multiple display devices. The computing system can include a primary display device from the multiple display devices, where the first view is provided to the primary display device, the second view is provided to a secondary display device from the multiple display devices, and the primary display device has less display capability than the secondary display device. The primary display device can include a monochrome display device that presents the first view without color, and the secondary display device can include a full-color display device that presents the second view with full color.

The rendered content can include a first page of the document, where the first page is presented in the first view and is different than a second page of the document presented in the second view. Generating the independent views of the electronic document can involve generating a user interface with the first view that provides control over the independent views on the display devices both together and separately; and the application can receive input adding new content to a page of the document during a presentation, and render the new content to the first view but not to the second view. The display devices can include three or more display devices. The second view can include additional rendered content not included in the first view. The electronic document can be an electronic document in a predetermined final format, such as PDF, that defines an appearance of the electronic document.

According to another aspect, a system can include one or more peripheral display devices, and a data processing system including a primary display device and a software application that generates simultaneous independent views of an electronic document on the display devices based on display characteristics of the display device as identified by the software application. The system can also include display buffers associated with the display devices, and the software application can include a display engine that concurrently renders the electronic document multiple times, each rendering being done in a different display context to one of the display buffers. The software application can identify the display devices that are currently interfaced with the data processing system by periodically polling display interface hardware.

The display characteristics can include screen resolution and color depth information. The primary display device can have less display capability than the one or more peripheral display devices. The primary display device can include a monochrome display device, and the one or more peripheral display devices can include one or more full-color display devices. The software application can concurrently render the electronic document multiple times according to presentation tags associated with content in the electronic document, the presentation tags indicating device-dependent rendering to be applied to the electronic document. A primary view from the independent views can include rendered content not included in a secondary view from the independent views. The primary view can include at least a portion of a user interface that provides control over the independent views on the display devices both together and separately, and the secondary view can form part of a slide show presentation.

The invention can be implemented to realize one or more of the following advantages. A professional high-fidelity display presentation can be given from any low-end device, such as a personal digital assistant, and there is no need to know beforehand what kind of display device might be encountered when it comes time to make the presentation. A monochrome device can be used to make a full color presentation to a device that supports color. A low resolution device can be used to make a high resolution presentation. Moreover, a distinction between the presenter's application view and the audience's application view can be made, allowing the presenter to see information in his view that the audience does not see and/or visa versa.

The data and/or the document format need not be specifically prepared for rendering to a particular target output device, and a presentation can be made to any target output device without specialized presentation hardware. The software application can render multiple or different views to multiple display devices connected to a host. Thus, the invention can be used as a tutoring assistant, where certain pages of a tutorial can be pushed to certain external displays while the host application/device can interact with another display that could act as a whiteboard for explaining intricate/complex concepts.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

As used herein, the terms "electronic document" and "document" mean a set of electronic data, including both electronic data stored in a file and electronic data received over a network. An electronic document does not necessarily correspond to a file. A document can be stored in a portion of a file that holds other documents, in a single file dedicated to the document in question, or in a set of coordinated files.

Figure 1:
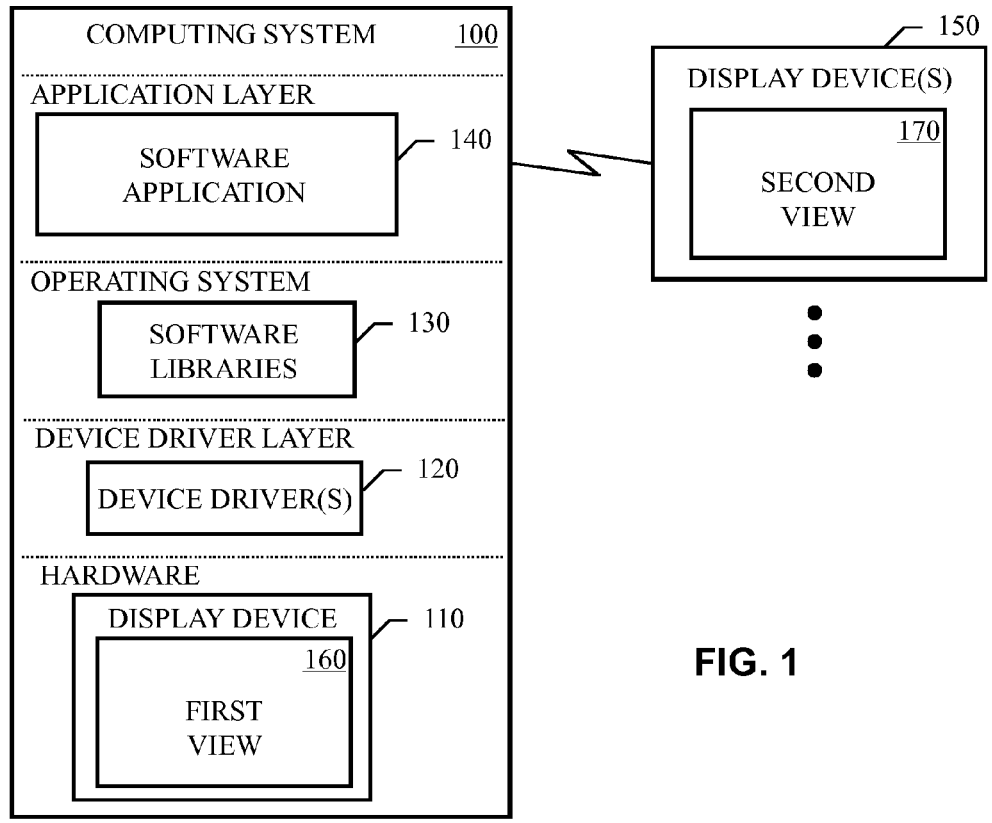
FIG. 1 is a block diagram illustrating a system in which a software application generates independent views for multiple display devices.

FIG. 1 is a block diagram illustrating a system in which a software application generates independent views for multiple display devices. A computing system 100 can be any machine having one more processors, including a personal computer, a laptop computer, a personal digital assistant (PDA), a minicomputer, a handheld device, a mobile phone, and a special purpose programmable machine. The system 100 includes a display device 110, such as a liquid crystal display (LCD) or a cathode ray tube (CRT) monitor. The system 100 can include one or more device drivers 120 in a device driver layer, and software libraries 130 in an operating system (OS) of the system 100. The device driver layer can be integrated with the OS and/or with the hardware (e.g., one or more device drivers 120 can be included in firmware of the system 100).

The system 100 can be connected to one or more additional display devices 150. The additional display device(s) 150 can include a peripheral or secondary device, such as a projector device, which can be connected to the system 100 through a wired or wireless communication medium, such as a cable, bus, or radio frequency (RF) connection (e.g., Bluetooth). The additional display device(s) 150 can include a display device that is part of another computing system, such as a desktop computer. The additional display device(s) 150 can include a stand alone display device, which may include processing components, such as a High Definition Television (HDTV) set.

The system 100 includes a software application 140, which is a single instance of a software application in an application layer of the system 140. The software application 140 can identify display characteristics of the multiple display devices 110, 150, and the software application 140 can generate independent views 160, 170 of an electronic document on the display devices 110, 150 based on the identified display characteristics. The views 160, 170 are visible electronic presentations. The views 160, 170 are independent because they can simultaneously present different content from an electronic document. A first of the independent views 160 can include content not included in a second of the independent views 170, and the second view 170 can include content not included in the first view 160. The system 100 can serve as a host machine, hosting an electronic document and the application 140 used to present the document. Content selected from the electronic document can be targeted to each specific output device based on the type of each device and each device's display characteristics.

Figure 2:
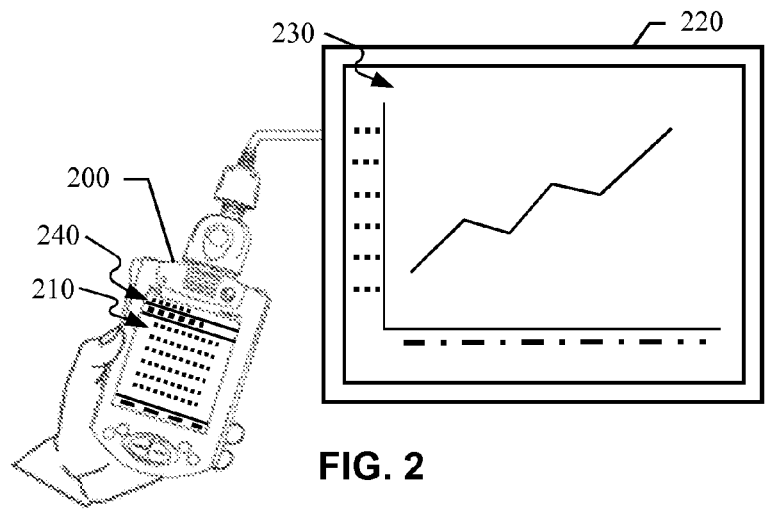
FIG. 2 illustrates an example of the system from FIG. 1.

In the context of slide show presentations, the system 100 can eliminate display limitations that might otherwise be imposed on the second view 170 by the nature of the display device 110. FIG. 2 illustrates an example of the system from FIG. 1. A PDA 200 corresponds to the system 100 and a large display device 220 (e.g., a HDTV set) corresponds to the display device 150. The PDA 200 can host a full color, high resolution presentation on the display device 220, even if the PDA 200 has limited resolution and color depth capabilities. The software application running on the PDA 200 can differentiate between the two display devices and can cause rendering of the document being presented to be performed separately for each display device.

The separate document renderings can be based on the different display characteristics of the display devices and also on the type of device. Thus, a view 210 on the PDA 200 can have different content than a view 230 on the display device 220, even when the same electronic document is being presented. For example, the application can render two different pages of the document to generate the two different views 210, 230, or the application can render the same page in a different manner to generate the two different views 210, 230. This targeting of content to the different display devices can be done both to address the display characteristics of the devices (e.g., various graphics from the document that are shown in the view 230 need not be shown in the view 210 on the PDA 200), and to facilitate the presentation (e.g., private notes relating to the current slide can be shown in the view 210 on the PDA 200, without also appearing in the view 230 on the display device 220). Moreover, the host system can present a user interface 240 on the host display without also presenting that user interface on the secondary display device, as is described further below.

Figure 3:
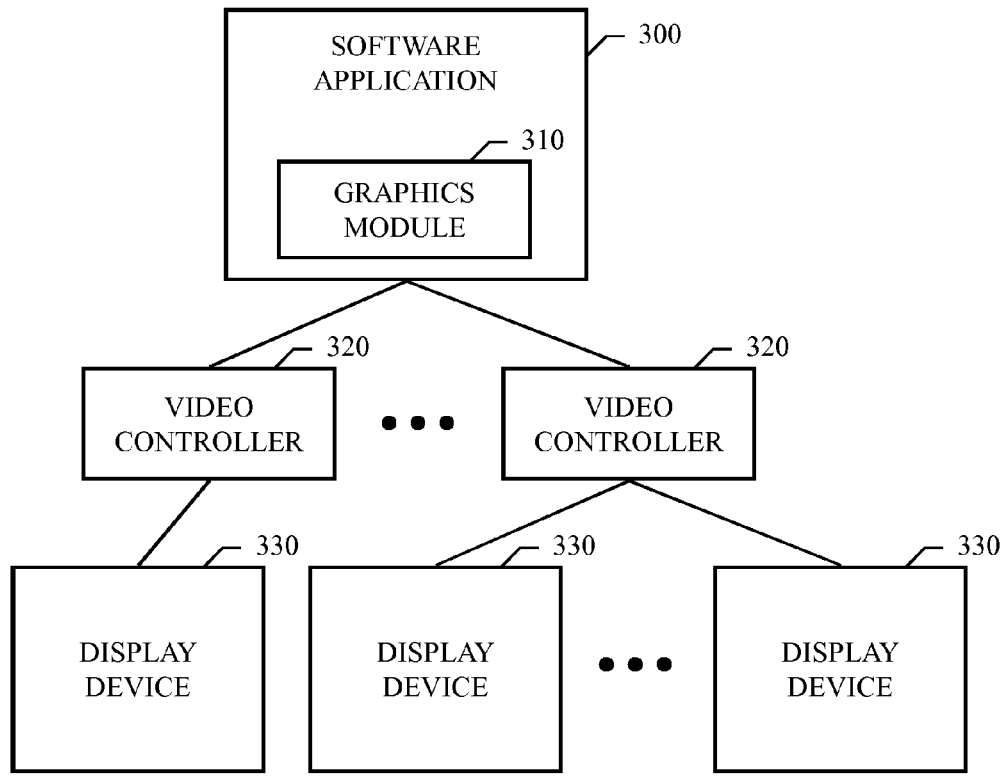
FIG. 3 is a block diagram illustrating another example system in which a software application generates independent views for multiple display devices.

FIG. 3 is a block diagram illustrating another example system in which a software application 300 generates independent views for multiple display devices 330. The software application 300 can simultaneously generate multiple outputs for the multiple display devices 330 and provide user control of the different outputs, irrespective of the different hardware capabilities. The software application 300 can dynamically tune itself to the different display parameters of the display devices 330 during run time, and different content can be sent to the devices 330 based on the different display parameters. This can be done as soon as the application 300 is initiated, or at a later time in response to an event, such as the initiation of a slide presentation.

The application 300 can include a graphics module 310 used to identify the display characteristics of the display devices 330 and to render an electronic document to the display devices 330. The application 300 and/or the graphics module 310 can be made up of multiple software modules. For example, the application 300 can be the ADOBE ACROBAT® software provided by Adobe Systems Incorporated of San Jose, Calif., and the graphics module 310 can be the PORTABLE DOCUMENT FORMAT™ (PDF™) Library and the Adobe Graphics Model (AGM) engine, also provided by Adobe Systems Incorporated. The graphics module 310 can identify the display characteristics by obtaining those characteristics from one or more video controllers 320 and/or from the two or more display devices 330. A video controller 320 can be dedicated to a single display device 330, or a video controller 320 can operate multiple display devices 330. The video controller(s) 320 can be add-on and/or built-in device interfaces, such as a video card (e.g., a video graphics array (VGA) card) or a video controller chip set built into a motherboard of a system.

The application 300 can perform multiple renderings of an electronic document for the display devices 330. Before a rendering of the document is to be performed, the application 300 can identify the currently connected display devices 330, and then iteratively render the document to the connected display devices 330. For a rendering to a display device, the application 300 can cause the graphics module 310 to select a compatible output port based on the obtained characteristics of the interfacing hardware, and then render the document (e.g., render a current page of the document as appropriate for the current interfacing hardware and destination hardware) on the hardware's display buffer, which can then be projected on the display device 330 by the video controller 320.

Figure 4:
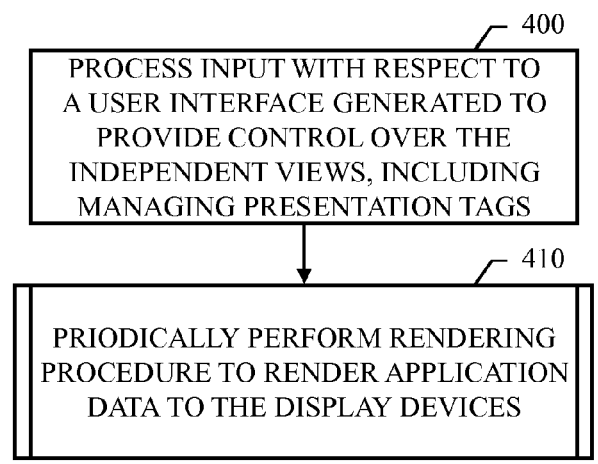
FIG. 4 is a flow chart illustrating generation of independent views for multiple display devices.

FIG. 4 is a flow chart illustrating generation of independent views for multiple display devices. Input can be processed with respect to a user interface at 400. The user interface can be generated to provide control over the independent views. A presenter can use a single user interface on one machine to control the views on both that machine and a second machine displaying a presentation to an audience. For example, the presenter can use the user interface to make notes in the electronic document during the presentation, where those notes do not appear in the view of the document that the audience sees, and the presenter can use the user interface to adjust the zoom level on the audience view without affecting a zoom level on the machine presenting the user interface. Thus, the user interface can apply different functionality differentially among the display devices, including potentially exposing different kinds of functionality for the different display devices.

Processing the input can also involve managing presentation tags. These presentation tags can allow a user to specify which content from the electronic document is rendered to which display device. The tags can be made part of the electronic document and associated with the content. For example, a user can specify some portions of an electronic document as public and other portions as private; the private content is then only presented on the hosting display device, whereas the public content can be presented on any of the display devices. This can be extended to any number of display devices, where all connected devices can be assigned a device type from a set of three or more device types, and the presentation tags can correspond to the three or more device types uniquely and/or in combination.

Moreover, the user can interact with the user interface to modify the tags either outside of a slide show presentation or even during the slide show presentation, providing full flexibility and control over how the electronic document is viewed on a particular display device, independent of the other display devices. For example, a user can keep the view on the host device in a document editing mode while the view on a second display device is in a slide show mode; the user can independently control the current page displayed on the host device and a different current page displayed on the second device, and also change the tags such that content previously not displayed on the second device is displayed on the second device after the change.

A rendering procedure can be periodically performed at 410 to render document data to the multiple display devices. The document can be an electronic document in a predetermined final format that defines an appearance of the electronic document (e.g., a PDF document). This predetermined final format can be a platform independent storage format capable of storing many different types of data, including graphics, animation and sound, and the defined appearance can be defined for multiple types of display devices. The rendering procedure can iteratively render the document data to the currently connected display devices, with each rendering being tailored to the capabilities of each target display device in turn. The periodicity of the rendering procedure call can be time driven or event driven, and need not be regular.

Figure 5:
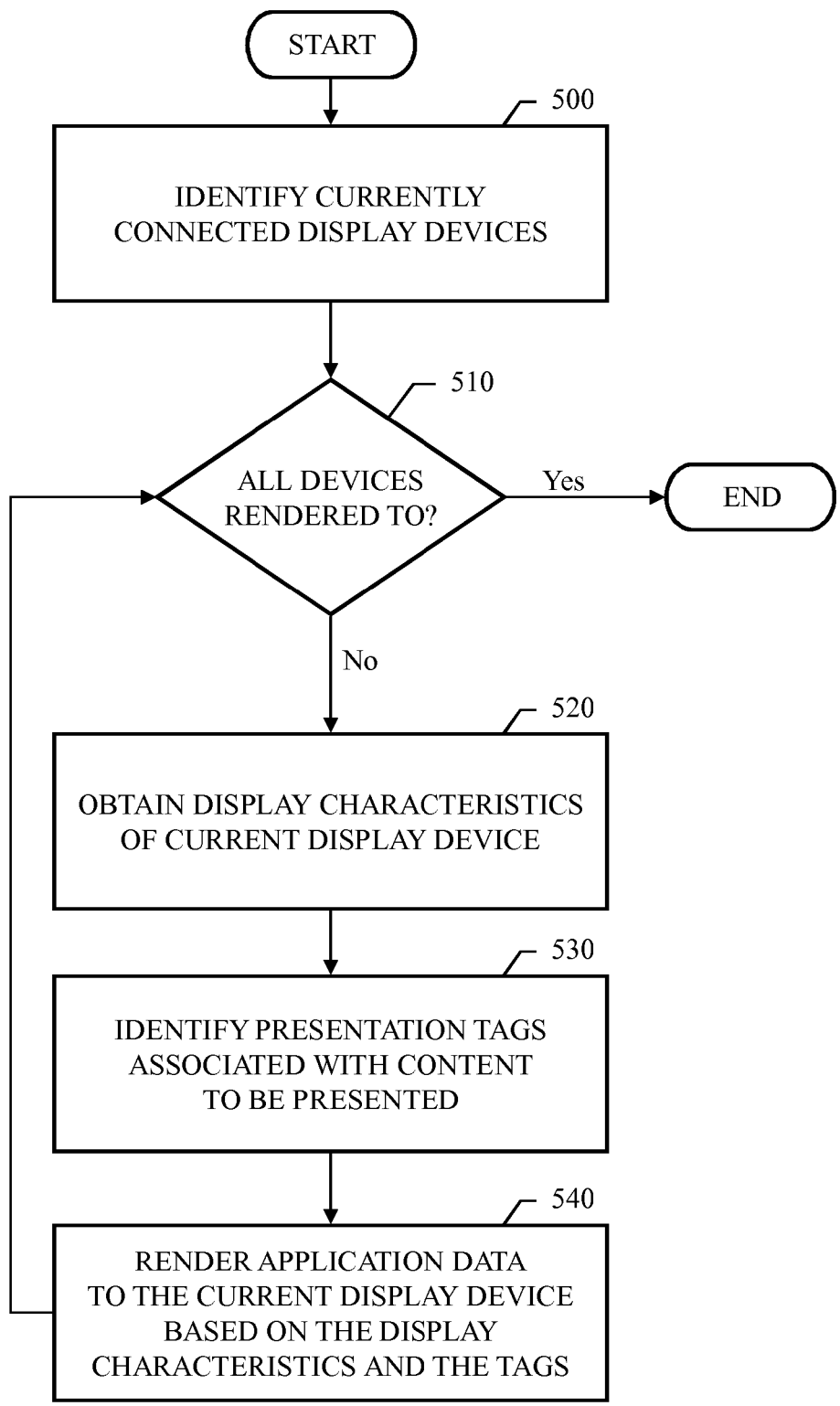
FIG. 5 is a flow chart illustrating an iterative rendering procedure.

FIG. 5 is a flow chart illustrating an iterative rendering procedure. The procedure starts by identifying currently connected display devices at 500. The procedure can cycle through the identified devices, not ending until all the identified devices to be rendered to, have been at decision 510. Display characteristics of a current device can be obtained at 520. This can involve setting configuration parameters according to the device parameters of the current display device in order to tune the data rendering to that display device (e.g., configuring a display engine by switching to using a set internal data structures that correspond to the current display context).

Presentation tags associated with content to be presented can be identified at 530. For example, document data can include tag information indicating device-dependent rendering to be applied to the content based upon assigned device types (e.g., host device and peripheral device types). The document can be rendered to the current display device based on the display characteristics and the presentation tags at 540. This rendering involves producing image data from the document, where the image data is in a format corresponding to the display device being rendered to, and takes into consideration the resolution and color depth of the display device. Content can be rendered to one display device, but not be rendered to another display device during the single rendering procedure depicted in FIG. 5. Such content can be document annotations (e.g., comments), graphics, animations, etc. The display characteristics can be screen resolution, color depth and refresh rate information.

The procedure illustrated by FIG. 5 can be performed in different manners. For example, the identifying and obtaining 500, 520 can be combined. The application can poll for the display characteristics whenever it is time to output to the display devices, and the currently connected devices can be identified in conjunction with obtaining the display characteristics. The application can iteratively configure a display engine for, and render to, the display devices identified by polling. For example, each display device can have its own device context, and the display engine can take parameters based on the current device context and render the document in that device context (e.g., the display engine can manipulate the device context of the hardware). The display engine can have multiple sets of rendering instructions, each set being tailored to each type of supported display device.

Regardless of the particular implementation details, the periodic identifying of display characteristics for currently connected display devices allows display devices to be added and removed dynamically to the system. In addition, the display characteristics of a presentation hosting machine need have no bearing on the display quality of the presentation on a peripheral device, because the rendering model can decide at run-time, based on the display characteristics of the peripheral device, what kind of content to render and in what manner to render it. The separate renderings to the dynamically identified display devices allow different content to be rendered to the different output devices, providing an application display architecture with significant flexibility and user control over how document data is viewed on multiple display devices that interface with a single computing system.

Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in a software program that is executable on a programmable system including at least one programmable processor coupled to receive data and instructions from, and to transmit data and instructions to, a data storage system, at least one input device, and at least two display devices. The software program can be implemented in a high-level procedural or object-oriented programming language, or in assembly or machine language if desired; and in any case, the language can be a compiled or interpreted language. The software program can include separate modules, including a graphics engine that can be used to handle two or more separate frame buffers for the two or more display devices. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks.

The invention has been described in terms of particular embodiments. Other embodiments are within the scope of the following claims. For example, the operations of the invention can be performed in a different order and still achieve desirable results, and the graphics engine can be initialized with the display characteristics at the application startup time or dynamically while rendering.

What is claimed is:

1. A method comprising:
   identifying, by a software application in a computing system, multiple display devices to which an electronic document is to be rendered; and
   generating, by the software application in the computing system, simultaneous independent views of the electronic document on the display devices, the independent views including a first view on a first of the display devices and a second view on a second of the display devices;
   wherein the generating comprises rendering at least some content from the electronic document to the first view on the first of the display devices, the rendered content included in the first view not being included in the second view on the second of the display devices.

2. The method of claim 1, wherein generating the independent views comprises separately rendering the electronic document according to presentation tags associated with content in the electronic document, the presentation tags indicating device-dependent rendering to be applied to the associated content in the electronic document.

3. The method of claim 2, further comprising managing the presentation tags associated with the content based on user input.

4. The method of claim 1, wherein the computing system comprises the first of the display devices, and the first of the display devices has less display capability than the second of the display devices.

5. The method of claim 1, wherein generating the independent views of the electronic document comprises generating at least a portion of a user interface with the first view that provides control over the independent views on the display devices both together and separately.

6. The method of claim 1, wherein the second view includes additional rendered content not included in the first view.

7. A software product tangibly embodied in a machine-readable medium, the software product comprising instructions operable to cause a data processing apparatus to perform operations from an application layer of the data processing apparatus, the operations comprising:
   identifying multiple display devices to which an electronic document is to be rendered; and
   generating simultaneous independent views of the electronic document on the display devices, the independent views including a first view on a first of the display devices and a second view on a second of the display devices;
   wherein the generating comprises rendering at least some content from the electronic document to the first view on the first of the display devices, the rendered content included in the first view not being included in the second view on the second of the display devices.

8. The software product of claim 7, wherein generating the independent views comprises separately rendering the electronic document according to presentation tags associated with content in the electronic document, the presentation tags indicating device-dependent rendering to be applied to the associated content in the electronic document.

9. The software product of claim 8, wherein the operations further comprise managing the presentation tags associated with the content based on user input.

10. The software product of claim 7, wherein the first of the display devices has less display capability than the second of the display devices.

11. The software product of claim 7, wherein generating the independent views of the electronic document comprises generating at least a portion of a user interface with the first view that provides control over the independent views on the display devices both together and separately.

12. The software product of claim 7, wherein the second view includes additional rendered content not included in the first view.

13. A system comprising:
one or more peripheral display devices; and
a data processing system comprising a primary display device and a software application that generates simultaneous independent views of an electronic document on the primary display device and the one or more peripheral display devices,
the independent views including a first view on the primary display device and a second view on the one or more peripheral display devices, and
the first view on the primary display device includes rendered content not included in the second view on the one or more peripheral display devices.

14. The system of claim 13, further comprising display buffers associated with the display devices, wherein the software application comprises a display engine that concurrently renders the electronic document multiple times, each rendering being done in a different display context to one of the display buffers.

15. The system of claim 13, wherein the software application identifies the display devices that are currently interfaced with the data processing system by periodically polling display interface hardware.

16. The system of claim 13, wherein the software application concurrently renders the electronic document multiple times according to presentation tags associated with content in the electronic document, the presentation tags indicating device-dependent rendering to be applied to the electronic document.

17. The system of claim 16, wherein the software application manages the presentation tags associated with the content based on user input.

18. The system of claim 13, wherein the primary display device has less display capability than the one or more peripheral display devices.

19. The system of claim 13, wherein the primary view includes at least a portion of a user interface that provides control over the independent views on the display devices both together and separately.

20. The system of claim 13, wherein the second view includes additional rendered content not included in the first view.

* * * * *